(12) United States Patent
Seo

(10) Patent No.: US 6,437,853 B2
(45) Date of Patent: Aug. 20, 2002

(54) THREE-DIMENSIONAL IMAGE CAPTURING DEVICE

(75) Inventor: Shuzo Seo, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,797

(22) Filed: Dec. 26, 2000

(30) Foreign Application Priority Data

Dec. 27, 1999 (JP) .......................................... 11-370787

(51) Int. Cl.[7] ............................ G01C 3/08; H04N 3/14; H04N 5/335
(52) U.S. Cl. ....................................... 356/5.01; 348/296
(58) Field of Search ............... 348/296; 356/5.01–5.04; 382/100–325

(56) References Cited

U.S. PATENT DOCUMENTS

| | | | | |
|---|---|---|---|---|
| 4,125,835 A | * | 11/1978 | Barry | 343/13 |
| 5,179,286 A | * | 1/1993 | Akasu | 280/561 |
| 5,181,101 A | * | 1/1993 | Oda | 358/41 |
| 5,461,481 A | * | 10/1995 | Bowen et al. | 356/430 |
| 5,519,209 A | * | 5/1996 | Rapoport et al. | 250/214 |
| 5,719,664 A | * | 2/1998 | Besesty et al. | 356/5.01 |
| 5,767,953 A | * | 6/1998 | McEwan | 356/5.01 |
| 5,949,530 A | * | 9/1999 | Wetteborn | 356/5.01 |
| 6,088,058 A | * | 7/2000 | Mead et al. | 348/296 |
| 6,088,085 A | * | 7/2000 | Wetteborn | 356/5.01 |
| 6,108,071 A | * | 8/2000 | Landry et al. | 356/5.05 |
| 6,259,478 B1 | * | 7/2001 | Hori | 348/296 |

OTHER PUBLICATIONS

U.S. patent application Ser. No. 09/717,212 to Seo, entitled "Three–Dimensional Image Capturing Device," filed Nov. 22, 2000.*

Christie et al., "Design and Development of a Multi–detecting Two–dimensional Ranging Sensor", Measurement Science Technology, vol. 6, pp. 1301–1308, 1995.

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A three-dimensional image capturing device which performs a distance measurement in first and second modes. In the first distance measurement mode, an electric charge accumulation period starts at the fall of a pulse of a distance measuring light beam, and ends after the fall of a pulse of a reflected light beam. In the second distance measurement mode, an electric charge accumulation period starts earlier than the fall of a pulse of the distance measuring light beam, by a predetermined time, and ends after the fall of a pulse of the reflected light beam. Based on a ratio of a first accumulated electric charge amount, obtained by the first distance measurement mode, to a second accumulated electric charge amount, obtained by the second distance measurement mode, the three-dimensional image is obtained.

12 Claims, 12 Drawing Sheets

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, amoiré topography, and soon, and the passive system comprises a stereo vision system, and so on.

An active system device is very bulky in comparison with that of the passive system, since the device requires a laser beam output mechanism. However, the active system device is superior regarding a distance measurement resolution, a measuring time, a measuring range and so on, and thus, despite the bulkiness, the device is utilized in various fields. In a three-dimensional image capturing device, described in "Measurement Science and Technology" (S. Christies et al., vol.6, p.1301–1308, 1995), a pulse-modulation laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

In a conventional three-dimensional image capturing device as described above, if the device is constructed in such a manner that information, which is used for correcting a reflectance to improve the accuracy of the distance measurement, is sensed, it may be necessary to expand the output range of the imaging device, such as CCD. However, merely expanding the output range of the imaging device will cause further difficulties in sufficiently improving the accuracy of the distance measurement.

SUMMARY OF THE INVENTION

Therefore, an object of the present invention is to improve the accuracy of the distance measurement when sensing a three-dimensional shape of a measurement subject without substantially expanding the output range of the imaging device.

According to the present invention, there is provided a three-dimensional image capturing device, comprising a light source, a first reflected light beam component sensing processor, a second reflected light beam component sensing processor and a distance calculation processor.

The light source irradiates a distance measuring light beam to a measurement subject. The distance measuring light beam is a pulsed beam. The measurement subject reflects the distance measuring light beam to generate a reflected light beam pulse. The first reflected light beam component sensing processor senses the reflected light beam pulse for a first constant period, which starts at a fall of the distance measuring light beam, to sense a first reflected light beam component including a fall of the reflected light beam pulse. The second reflected light beam component sensing processor senses the reflected light beam pulse for a second constant period, which has the same length as the first constant period and starts earlier than the fall of the distance measuring light beam, to sense a second reflected light beam component which includes the fall of the reflected light beam pulse. The distance calculation processor obtains the distance from the device to each point of the surface of the measurement subject based on the first and second reflected light beam components.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
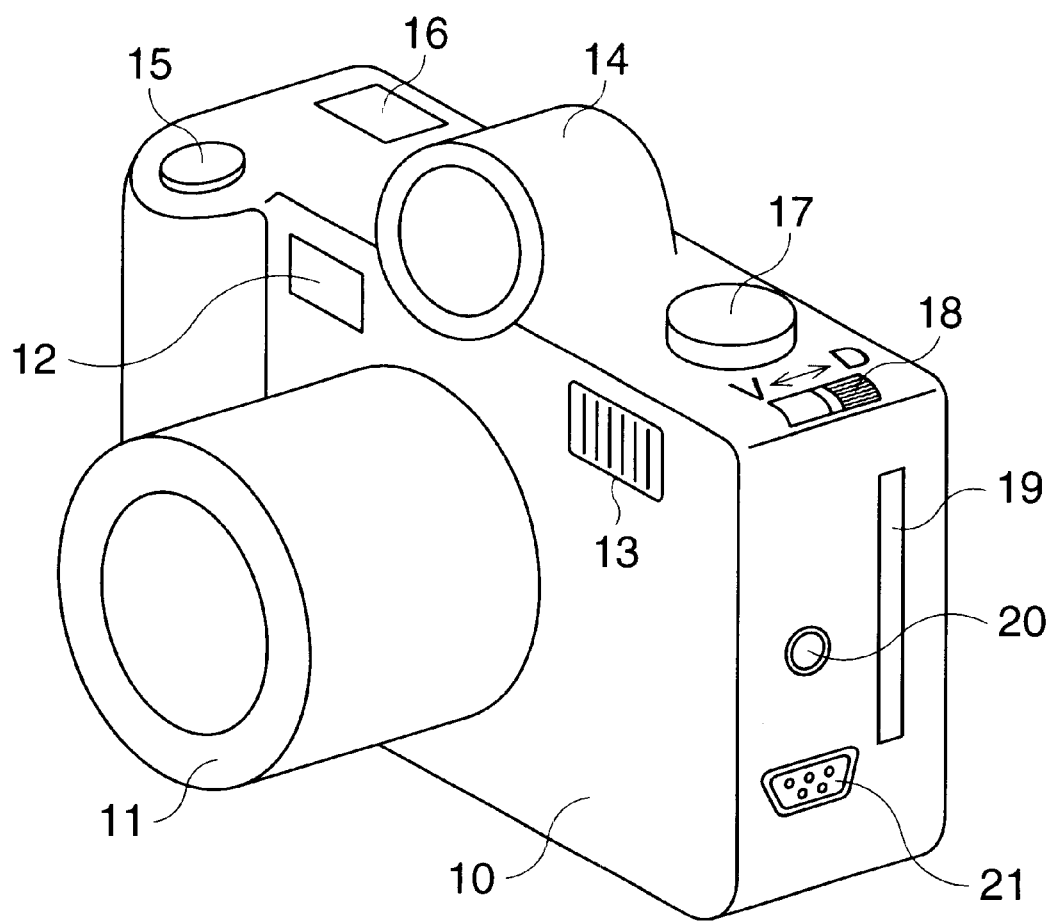
FIG. 1 is a perspective view showing a camera provided with a three-dimensional image capturing device of an embodiment of the present invention.

The present invention will be described below with reference to the embodiments shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
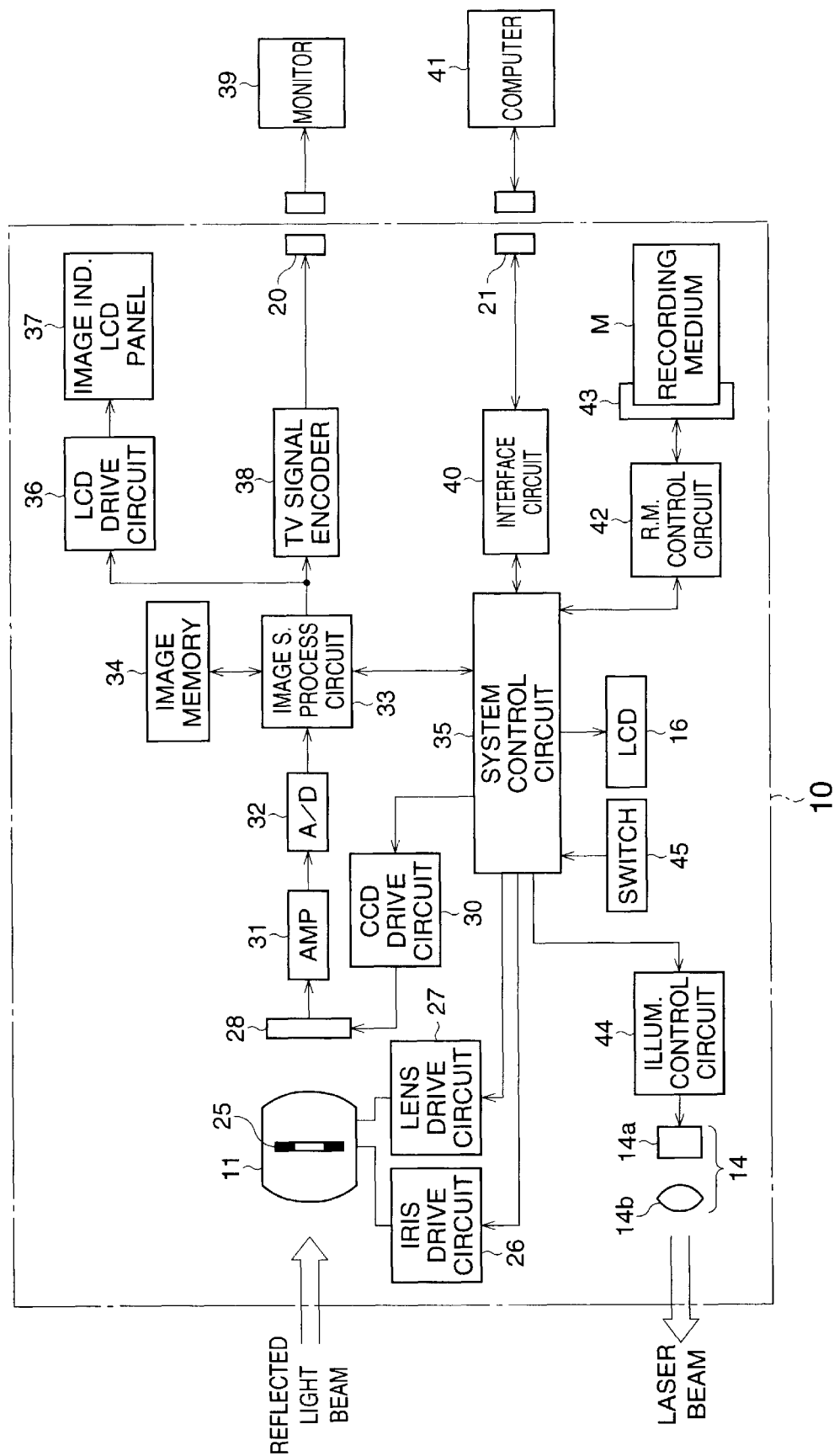
FIG. 2 is a block diagram showing an electrical construction of the camera shown in FIG. 1.

FIG. 2 is a block diagram showing an electrical construction of the camera shown in FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34 can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

An illumination control circuit 44 is connected to the system control circuit 35. The light emitting device 14 is provided with a luminous-flux emitting element 14a and an illumination lens 14b, and an operation of the luminous-flux emitting element 14a is controlled by the luminous-flux emitting element control circuit 44. The luminous-flux emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control of a transferring operation and so on, in the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35.

Figure 3:
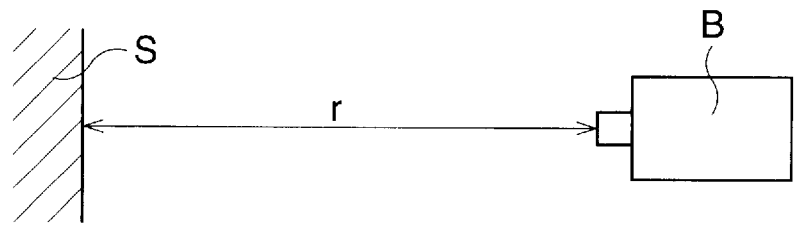
FIG. 3 is a view showing a principle behind a distance measurement.
Figure 4:
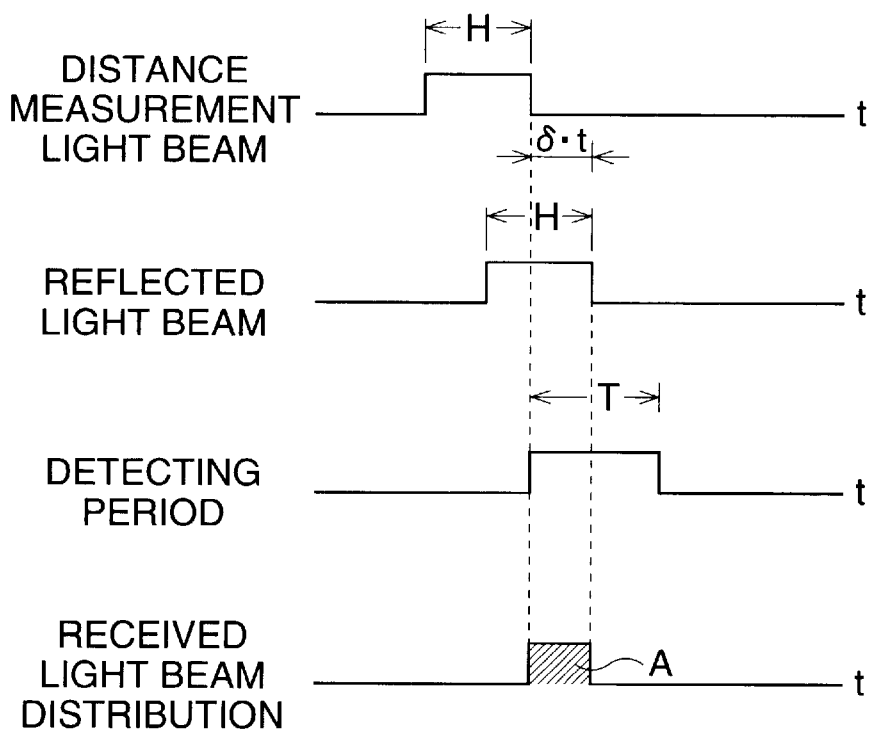
FIG. 4 is a timing chart showing a distance measuring light beam, a reflected light beam, a gate pulse and a distribution of an amount of a light beam received by a CCD.

With reference to FIGS. 3 and 4, a principle behind a distance measurement in the embodiment is described below. Note that, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similar to the distance measuring light beam. Therefore, the fall of the pulse of the reflected light beam occurs after the fall of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C/ \qquad (1)$$

wherein "C" is the velocity of light.

For example, by setting a condition in such a manner that the reflected light beam can only be sensed from a fall of the pulse of the distance measuring light beam to a point after a fall of the pulse of the reflected light beam so as to sense a component containing the fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the greater the received light amount A.

In this embodiment, by taking advantage of the principle described above, the received light amount A is sensed using each of the photo-diodes (photo electric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
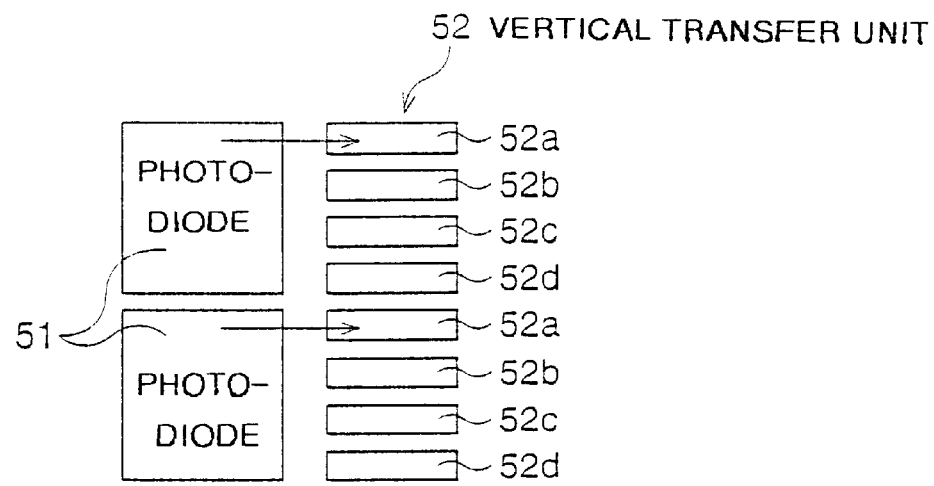
FIG. 5 is a plan view showing a disposition of photodiodes and a vertical transfer unit, which are provided in the CCD.
Figure 6:
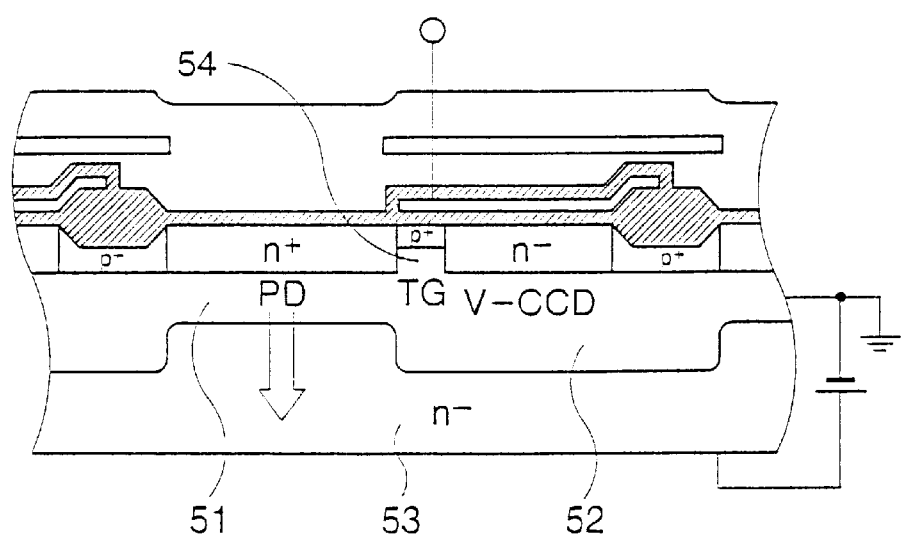
FIG. 6 is a sectional elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that the number of vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and the amount of the electric charge corresponds to an amount of an incident light beam, which is the reflected light beam reflected by the measurement subject. When the substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electric shuttering operation is performed.

Figure 7:
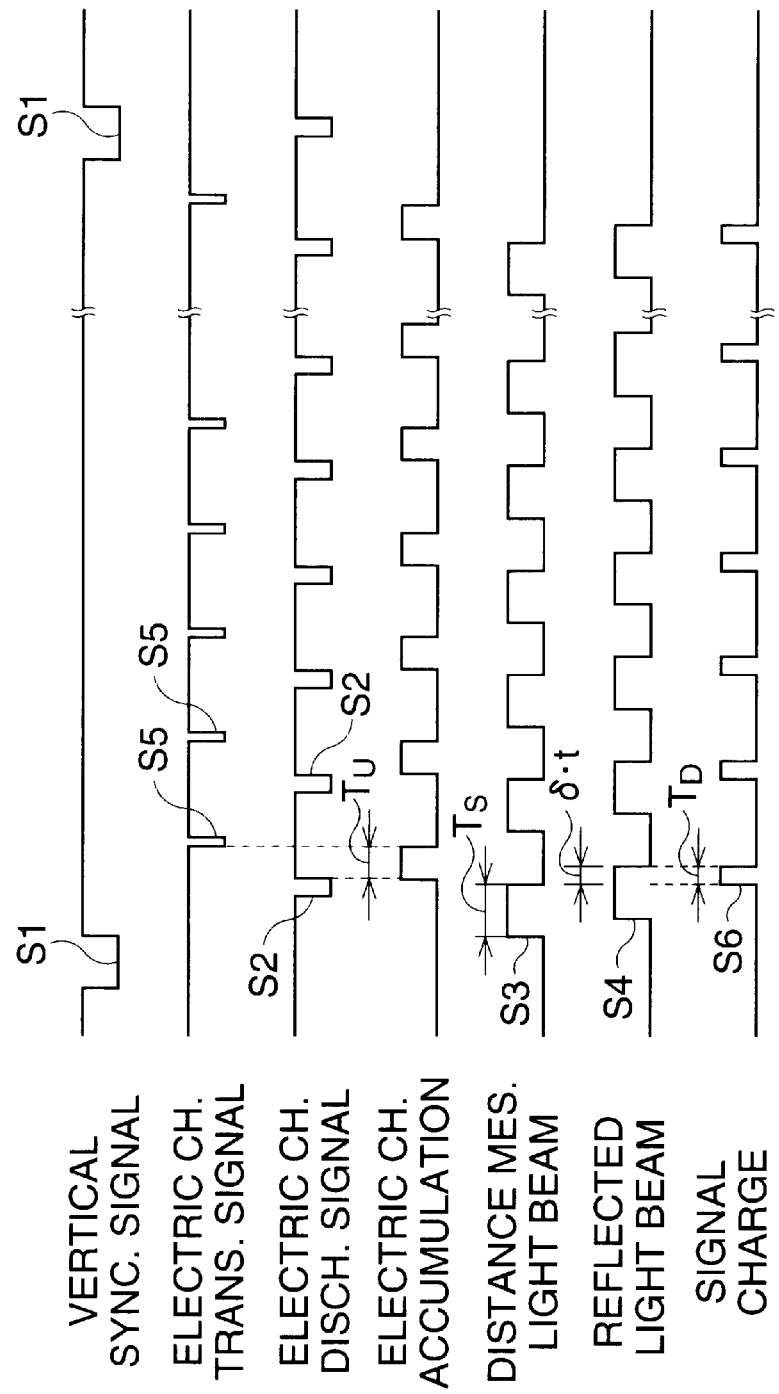
FIG. 7 is a timing chart of the distance information sensing operation according to a first distance measurement mode.

FIG. 7 is a timing chart of a distance information sensing operation of a first distance measurement mode, by which data, corresponding to the distance from the camera body 10 to each point on a surface of the measurement subject, is sensed. The distance information sensing operation is described below with reference to FIGS. 1, 2, 5, 6 and 7.

In synchronization with an output of a vertical synchronizing signal S1, the light emitting device 14 is actuated, and thus a distance measuring light S3, which is a pulsed beam having a constant width, is output therefrom. The distance measuring light S3 is reflected by the measurement subject, and enters the CCD 28 as a reflected light beam S4. In synchronization with a timing at which the output of the distance measuring light S3 is completed, an electric charge discharging signal (a pulse signal) S2 is output. The output of the electric charge discharging signal S2 is controlled to terminate at the same time the output of the distance measuring light S3 is complete. Due to this, unwanted charge accumulated in the photo-diodes 51 is discharged to the substrate 53. When a predetermined time has elapsed since the output of the distance measuring light S3, an electric charge transfer signal (pulse signal) S5 is output, so that an electric charge accumulated in the photo-diodes 51 is transferred to the vertical transfer unit 52. Note that the electric charge transfer signal S5 is output after the pulse of the reflected light beam S4 is completed.

Thus, for a period $T_U$ from the end of the output of the electric charge discharging signal S2 to the beginning of the output of the electric charge transfer signal S5, a signal charge corresponding to the distance from the camera body 10 to the measurement subject is accumulated. Namely, the electric charge accumulating period $T_U$ is started at the same time as a period $T_S$ ends, for which the distance measuring light S3 is output, and during the electric charge accumulating period $T_U$, only a part of the reflected light beam S4, which is a first reflected light beam component including a fall of the pulse of the reflected light beam S4, is detected by the CCD 28. A signal charge S6, generated by the detected light beam, corresponds to the distance from the camera body 10 to the measurement subject. In other words, the signal charge S6, corresponding to a light beam, which is included in the reflected light beam S4 coming from the measurement subject and reaches the photo-diodes 51 within the electric charge accumulation period $T_U$, is accumulated in the photo-diodes 51. The signal. charge S6 is transferred to the vertical transfer unit 52 by the electric charge transfer signal S5.

After a predetermined time has elapsed since the output of the electric charge transfer signal S5, the electric charge discharging signal S2 is again output, so that unwanted charge, which is accumulated in the photo-diodes 51 after the transfer of the signal charge S6 to the vertical transfer unit 52, is discharged to the substrate 53. Thus, another charge, due to the next distance measuring light, is accumulated in the photo-diodes 51. Then, similarly to the above description, when the electric charge accumulation period $T_U$ has again elapsed, the signal charge S6 is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measured subject.

The reflected light beam, sensed by the CCD 28 as described above, may be affected by a reflectance of the surface of the measurement subject. Therefore, the distance information, obtained through the reflected light beam, may contain an error resulting from the reflectance. Further, the reflected light beam sensed by the CCD 28 may contain a noise component, such as ambient daylight, being other than the reflected light beam from the measurement subject, which can cause an error. Accordingly, in the distance information sensing operation, it is preferable that influences of the reflectance of the surface of the measurement subject, the ambient daylight and so on, are corrected. A distance information sensing operation, in which the correction is performed, is described below.

Figure 8:
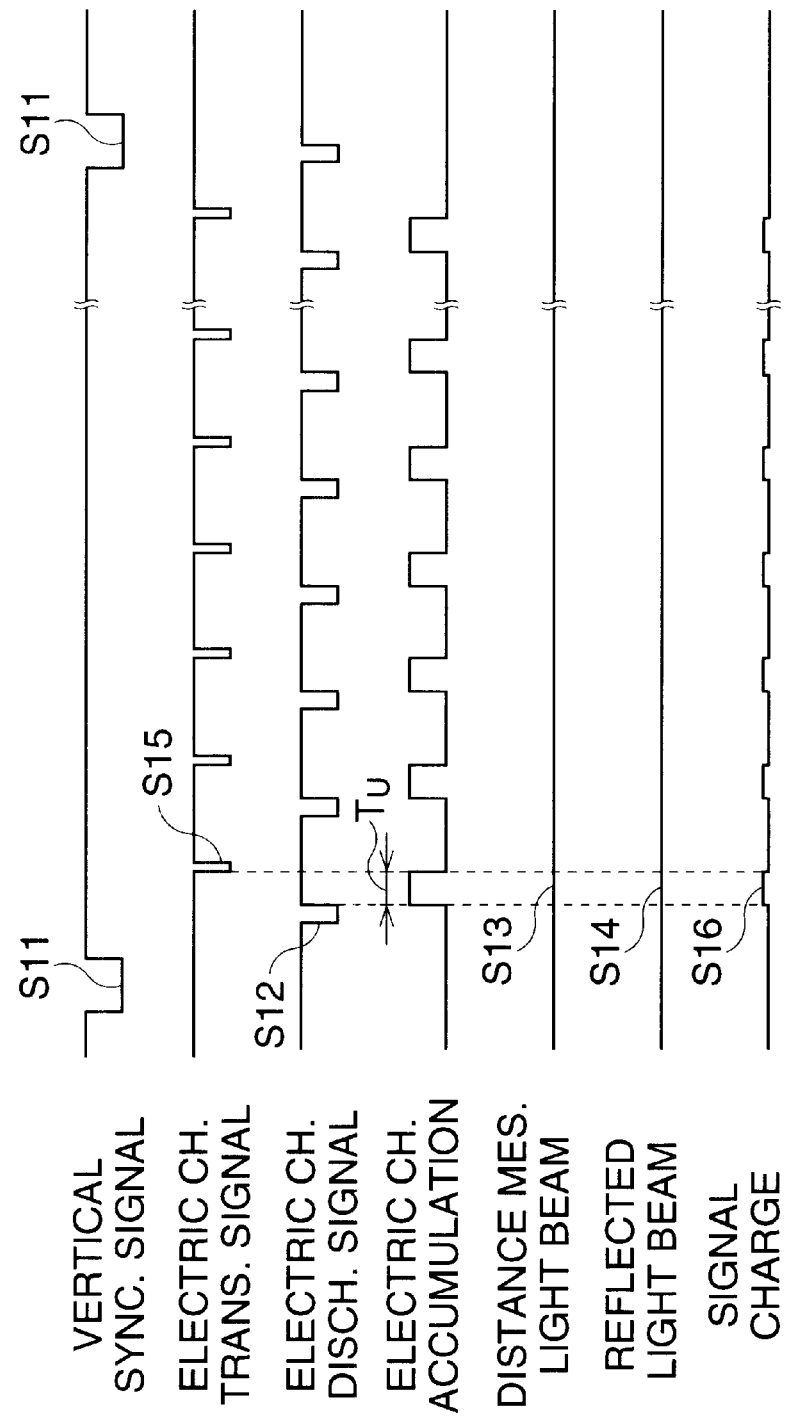
FIG. 8 is a timing chart of the distance correction information sensing operation of a first noise component.
Figure 9:
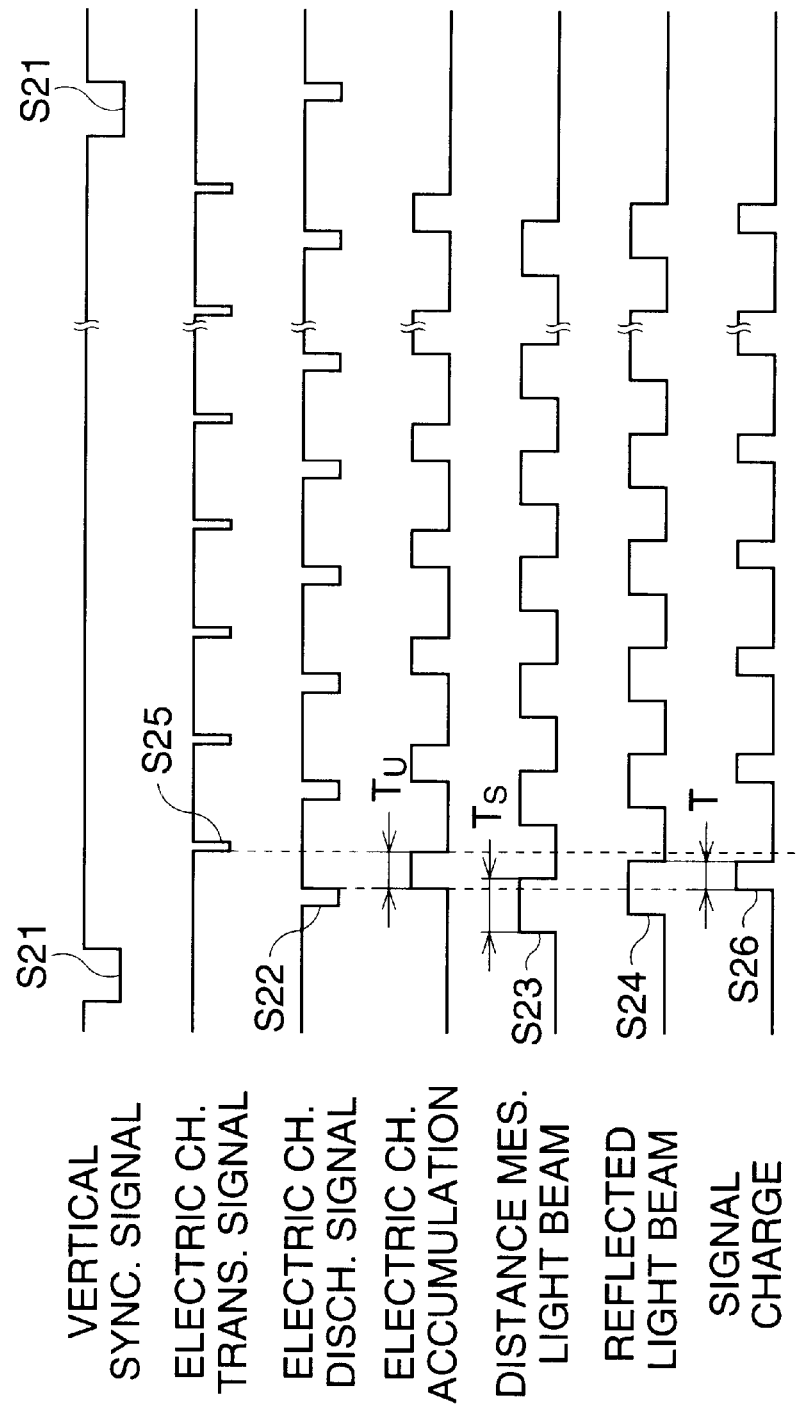
FIG. 9 is a timing chart of the reflectance information sensing operation according to a second distance measurement mode.
Figure 10:
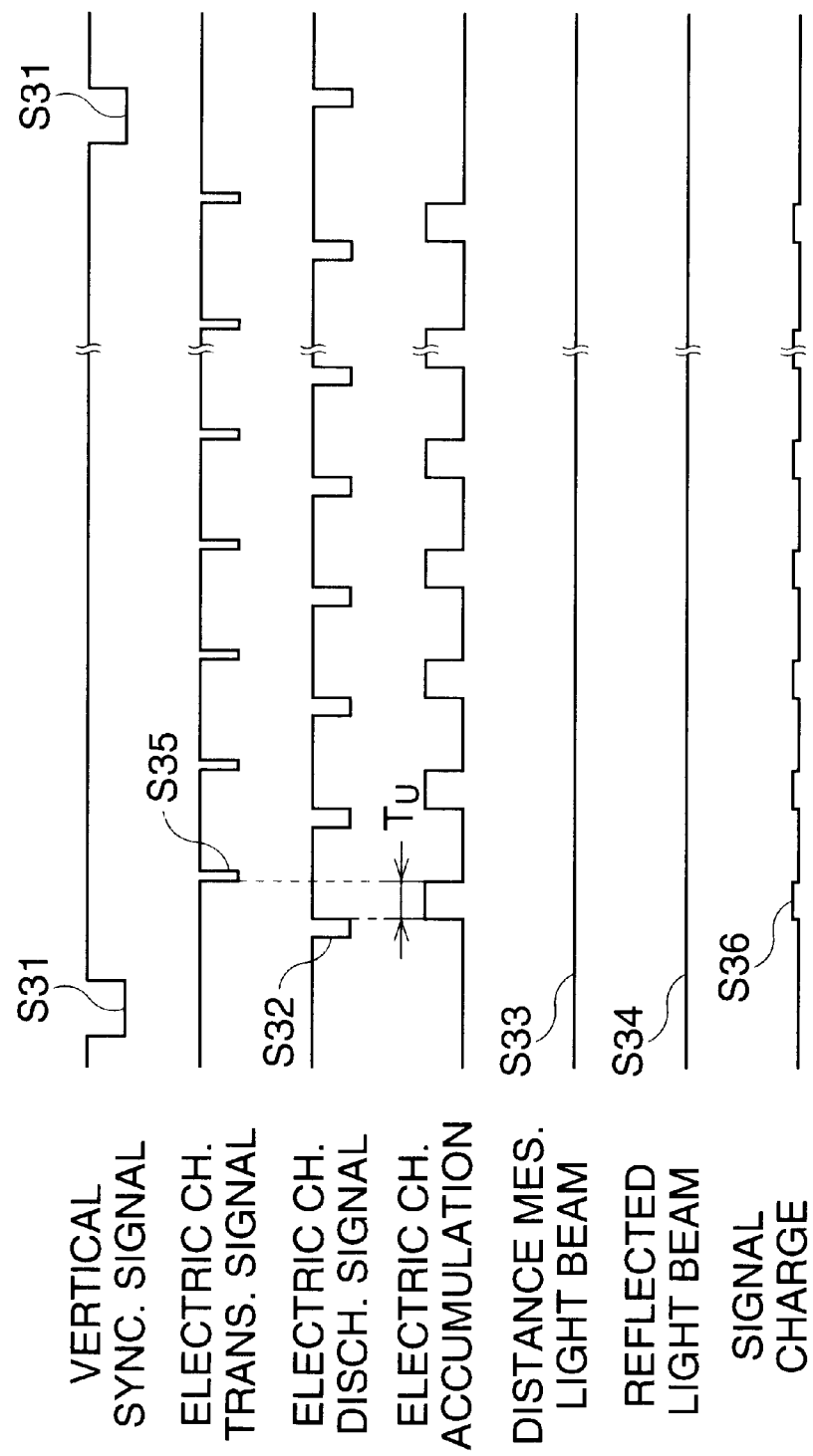
FIG. 10 is a timing chart of the reflectance correction information sensing operation of a second noise component.
Figure 11A:
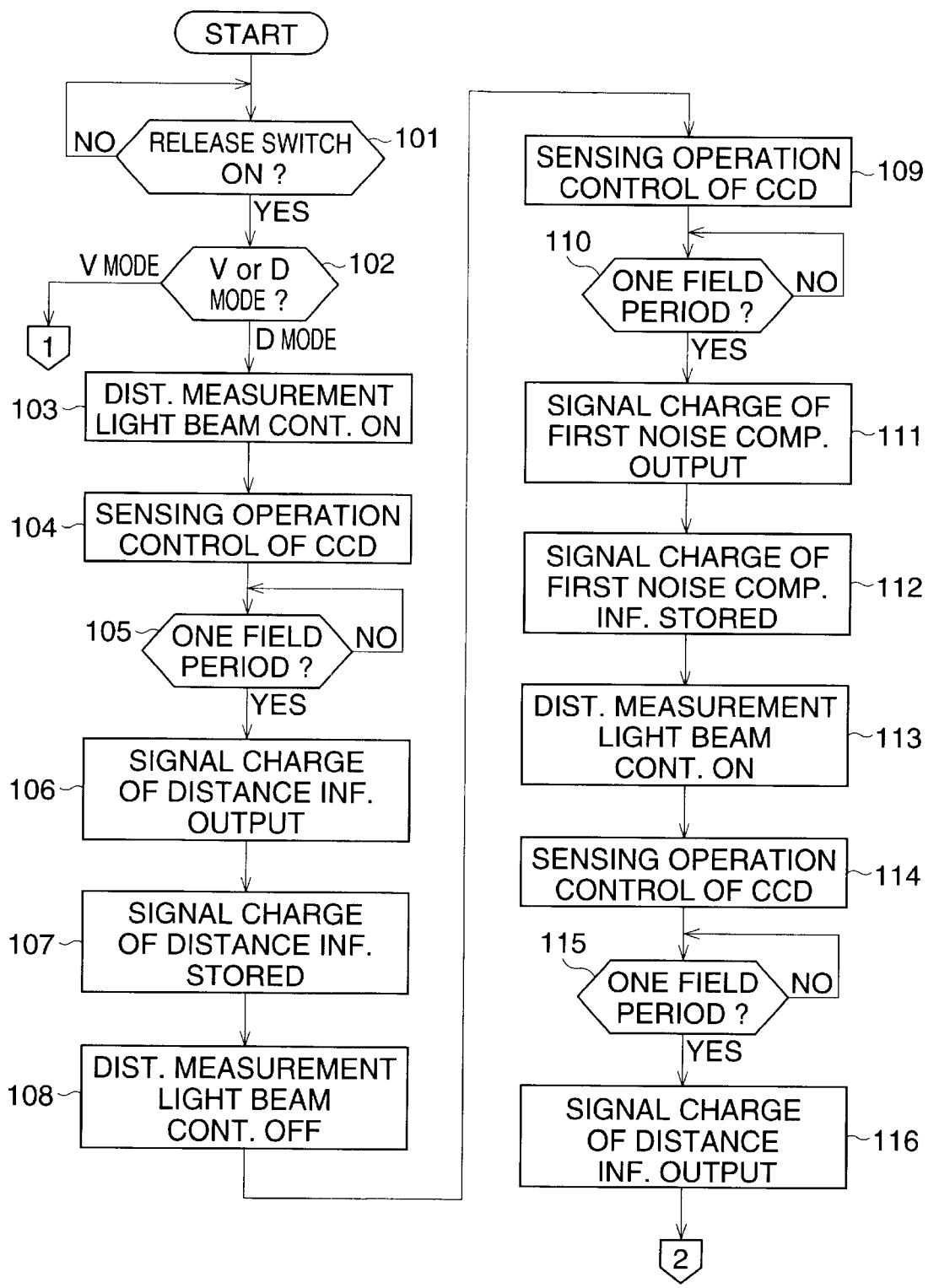
FIGS. 11A and 11B show a flowchart of the distance information sensing operation in which the distance information and the first and second noise components are sensed.
Figure 11B:
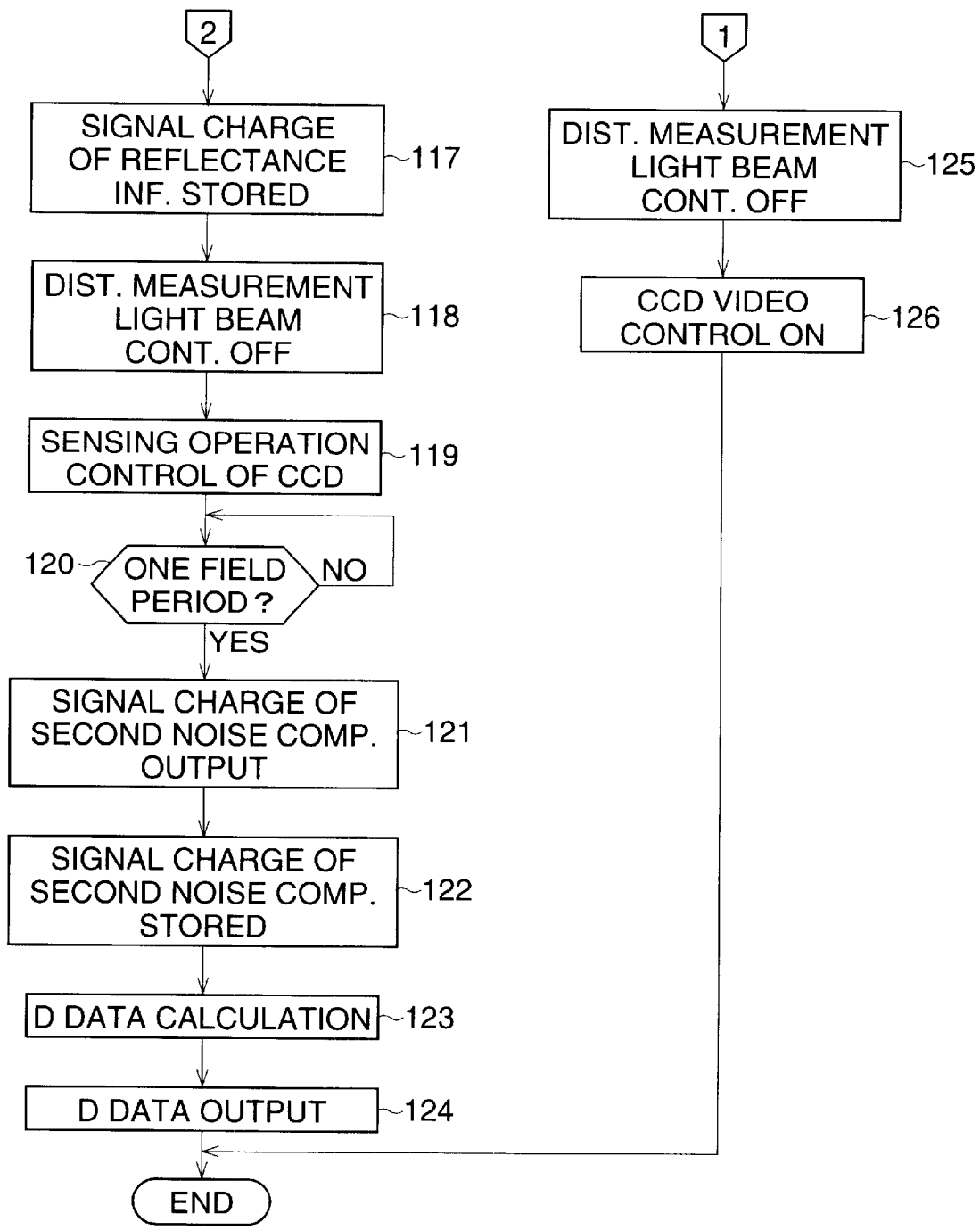

FIGS. 8, 9 and 10 show sensing operations of a first noise component, distance correction information of a second distance measurement mode and a second noise component, respectively. FIGS. 11A and 11B show a flowchart of the distance information sensing operation. With reference to FIGS. 1, 2, 7, 8, 9, 10, 11A and 11B, the distance information sensing operation, in which influences of the reflectance of the surface of the measurement subject, noise and so on, are corrected, is described.

When it is recognized in Step 101 that the release switch 15 is fully depressed, Step 102 is executed in which it is determined which mode is selected, a video (V) mode or a distance measurement (D) mode. A change between the modes is carried out by operating the V/D mode switch 18.

When the D mode is selected, in Steps 103 through 107, the distance information sensing operation of the first distance measurement mode is performed. In Step 103, the vertical synchronizing signal S1 is output and a distance measuring light beam control is started. Namely, the light emitting device 14 is driven so that the distance measuring light beam S3 is intermittingly output as a pulsed beam. Then, Step 104 is executed so that a sensing operation control of the CCD 28 is started. Namely, the distance information sensing operation of the first distance measurement mode, described with reference to FIG. 7, is started, and thus the electric charge discharging signal S2 and the electric charge transfer signal S5 are alternately output, so that the signal charge S6 of the distance information is integrated in the vertical transfer unit 52.

In Step 105, it is determined whether one field period has elapsed since the beginning of the distance information sensing operation, i.e., whether a new vertical synchronizing signal S1 has been output. When one field period has passed, the process goes to Step 106 in which the signal charge S6 of the distance information is output from the CCD 28. The signal charge S6 is then stored in the image memory 34 in Step 107. Then, in Step 108, the distance measuring light beam control is turned OFF, and thus the light emitting operation of the light emitting device 14 is stopped.

In Steps 109 through 112, the sensing operation of the first noise component is performed. In Step 109, as shown in FIG. 8, the vertical synchronizing signal S11 is output, and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_U$ is the same as that of the distance information sensing operation shown in FIG. 7, the distance measuring light beam does not irradiate the measurement subject (reference S13), and thus there is no reflected light beam (reference S14). Therefore, although a signal charge of the distance information is not generated, a signal charge S16 corresponding to an interference or noise component is generated, since a noise component, such as ambient daylight, etc., enters the CCD 28. The signal charge S16 corresponds to the noise component, contained in the signal charge S6, obtained in the distance information sensing operation of the first distance measurement mode.

In Step 110, it is determined whether one field period has elapsed since the beginning of the sensing operation of the first noise component, i.e., whether a new vertical synchronizing signal S11 has been output. When one field period has passed, the process goes to Step 111 in which the signal charge S16 of the first noise component is output from the CCD 28. The signal charge S16 of the first noise component is then stored in the image memory 34 in Step 112.

In Steps 113 through 117, the distance information sensing operation of the second distance measurement mode is performed. In Step 113, as shown in FIG. 9, a vertical synchronizing signal S21 is output, and a distance measuring light beam control of the CCD 28 is started, so that a distance measuring light beam S23 is intermittently output as a pulsed beam. In Step 114, a sensing operation control of the CCD 28 is started, and thus an electric charge discharging signal S22 and an electric charge transfer signal S25 are alternately output.

In the distance information sensing operation of the second distance measurement mode, an electric charge discharging signal S22 is output in such a manner that the reflected light beam S24 is sensed at a timing earlier than the fall of the pulse of the distance measuring light beam S23, and an electric charge transfer signal S25 is controlled in such a manner that the sensing period of the reflected light beam S24, i.e., the length of the electric charge accumulation period $T_U$, becomes equal to that of the electric charge accumulation period $T_U$ of the distance information sensing operation of the first distance measurement mode. Therefore, in the second distance measurement mode, a second reflected light beam component containing a fall of the pulse of the reflected light beam S24 is sensed, and the amount of electric charge of the second reflected light beam component is greater than that of the first reflected light beam component.

In Step 115, it is determined whether one field period has elapsed since the beginning of the distance information sensing operation of the second distance measurement mode, i.e., whether a new vertical synchronizing signal S21 has been output. When one field period has passed, the process goes to Step 116 in which the signal charge S26 of the distance information is output from the CCD 28. The signal charge S26 is then stored in the image memory 34 in Step 117. Then, in Step 118, the distance measuring light beam control is turned OFF, and thus the light emitting operation of the light emitting device 14 is stopped.

In Steps 119 through 122, the sensing operation of the second noise component is performed. In Step 119, as shown in FIG. 10, a vertical synchronizing signal S31 is output, and a sensing operation control of the CCD 28 is started. Namely, an electric charge discharging signal S32 and an electric charge transfer signal S35 are alternately output while the light emitting operation of the light emitting device 14 is not carried out. Although the length and timing of the electric charge accumulation period $T_U$ are the same as those of the distance information sensing operation of the second distance measurement mode shown in FIG. 9, the distance measuring light beam does not irradiate the measurement subject (reference S33), and thus there is no reflected light beam (reference S34). Therefore, although a signal charge of the distance information is not generated, a signal charge S36 corresponding to a noise component, such as the ambient daylight, is generated in the CCD 28. Namely, the signal charge S36 corresponds to the noise component, which is contained in the signal charge S26 obtained in the distance information sensing operation of the second distance measurement mode.

In Step 120, it is determined whether one field period has elapsed since the beginning of the sensing operation of the second noise component, i.e., whether a new vertical synchronizing signal S31 has been output. When one field period has passed, the process goes to Step 121 in which the signal charge S36 of the second noise component is output from the CCD 28. The signal charge S36 is stored in the image memory 34 in Step 122.

The signal charges S6 and S26 obtained in the first and second distance measurement modes, respectively, correspond to the distance information from the camera to the measurement subject, and contain the reflected light beam components, which depend upon the reflectance of the surface of the measurement subject, and the noise component, such as the ambient daylight. In Step 123, a calculation process of the distance measurement (D) data is performed using the distance information of the first and second distance measurement modes and the first and second noise components, which are obtained in Steps 103 through 122. The D data is output in Step 124, and the sensing operation ends.

Conversely, when it is determined in Step 102 that the V mode is selected, the distance measuring light beam control is turned OFF in Step 125, and a normal photographing operation (i.e., CCD video control) using the CCD 28 is turned ON in Step 126. Then, the sensing operation ends.

Figure 12:
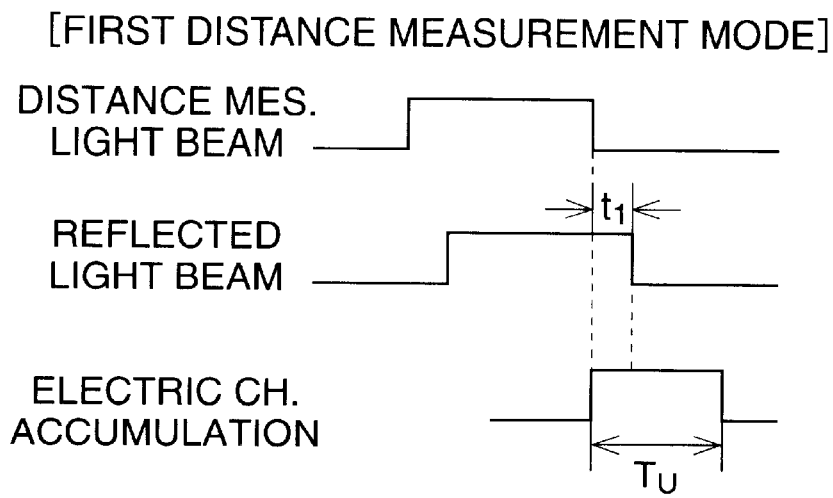
FIG. 12 is a view showing the timing of a distance measuring light beam, a reflected light beam and an electric charge accumulation period in the distance information sensing operation in the first distance measurement mode.
Figure 13:
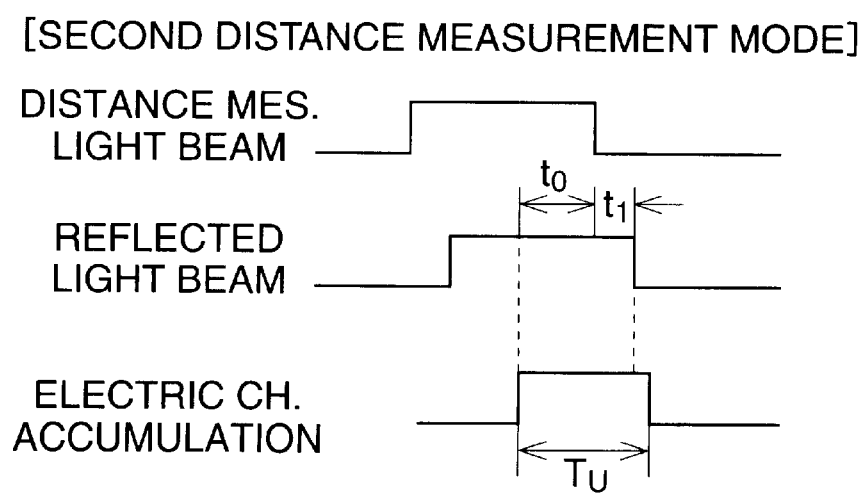
FIG. 13 is a view showing timings of a distance measuring light beam, a reflected light beam and an electric charge accumulation period in the distance information sensing operation in the second distance measurement mode.

The contents of the calculations executed in Step 123 are described below with reference to FIGS. 12 and 13. FIG. 12 is a view in which a distance measuring light beam, a reflected light beam and an electric charge accumulation period in the distance information sensing operation in the first distance measurement mode shown in FIG. 7 are shown. FIG. 13 is a view in which a distance measuring light beam, a reflected light beam and an electric charge accumulation period in the distance information sensing operation in the second distance measurement mode shown in FIG. 9 are shown.

In the first distance measurement mode, the electric charge accumulation period $T_U$ starts at the same time as a fall of a pulse of the distance measuring light beam, and ends after a fall of a pulse of the reflected light beam. Namely, a signal charge S6 (see FIG. 7), corresponding to a time $t_1$ of the reflected light beam, is sensed. An accumulated electric charge amount $E_1$, which is a first reflected light beam component and is obtained by integrating the signal charge S6, is $$E_1 = k \times I \times t_1 \times N \quad (2)$$

wherein "k" is a proportional coefficient, "I" is intensity of a reflected light beam and "N" is the number of pulses of a distance measurement light beam.

Conversely, in the second distance measurement mode, the electric charge accumulation period $T_U$ starts earlier than the fall of a pulse of the distance measuring light beam by a time $t_0$, and ends after the fall of a pulse of the reflected light beam. Namely, the time $t_0$ is the difference between a sensing timing of the reflected light beam in the first distance measurement mode and a sensing timing of the reflected light beam in the second distance measurement mode, and in the second distance measurement mode, a signal charge S26 (see FIG. 9), corresponding to a time $(t_0+t_1)$ of the reflected light beam, is sensed. An accumulated electric charge amount $E_2$, which is a second reflected light beam component and is obtained by integrating the signal charge S26, is $$E_2 = k \times I \times (t_0+t_1) \times N \quad (3)$$

If it is deemed in formula (1) that the delay coefficient δ is 1, a distance do corresponding to the time $t_0$ is expressed as follows:

$$d_0 = t_0 \times C/2 \quad (4)$$

On the other hand, a distance d from the camera to the measurement subject is expressed as follows:

$$d = t_1 \times C/ \quad (5)$$

According to formulas (2) and (3), an accumulated electric charge ratio Q is expressed as follows:

$$Q = E_1/E_2 \quad (6)$$
$$= t_1/(t_0+t_1)$$
$$= d/(d_0+d)$$

Accordingly, the distance d is expressed as follows:

$$d = d_0 \times Q/(1-Q) \quad (7)$$

The intensity I of the reflected light beam contains influences such as the reflectance of a surface of the measurement subject and dispersion of a reflected light beam derived from the measurement subject. For example, if the reflectance becomes small, the intensity I of the reflected light beam becomes low, so that the accumulated electric charge amount of the distance information will decrease. In this case, if the distance from the camera to the measurement subject is detected using formula (5) as is, a measurement error would occur because of the influence of the reflectance. However, the distance d obtained using formula (7) does not contain the influence such as the reflectance, since the accumulated electric charge ratio Q does not contain the intensity I of the reflected light beam, as understood from formula (6).

On the other hand, the accumulated electric charge amounts $E_1$ and $E_2$ contain accumulated electric charge corresponding to the first and second noise components. Therefore, in reality, the accumulated electric charge ratio Q is obtained by dividing a first value, which is obtained by removing an accumulated electric charge amount corresponding to the first noise component from the accumulated electric charge amount $E_1$, by a second value, which is obtained by removing an accumulated electric charge amount corresponding to the second noise component from the accumulated electric charge amount $E_2$.

Thus, in the calculation process of Step 123 of FIG. 11B, based on the first and second reflected light beam components, which are obtained in the distance information sensing operations of the first and second distance measurement modes, and the first and second noise components, the distance d from the camera to each point of a surface of the measurement subject, i.e. a three-dimensional shape of the measurement subject is obtained according to formulas (4), (6) and (7).

The amount of the accumulated electric charge sensed in the first and second distance measurement modes and an output range of the CCD 28 (FIG. 2) are described below.

When a subject having a reflectance R is illuminated by a point light source positioned close to a forming optical system so that the subject is deemed as a two-dimensional light source of a luminance $L_0$, and the subject image is formed on an image sensor by the forming optical system, if a flare component is neglected, illuminance Eθ of the optical image is as follows:

$$E\theta = (\tau \pi L_0 V \times \cos^4 \theta)/(4F^2(1+m)^2) \quad (8)$$

wherein "τ" is transmittance of a lens of the forming optical system, "V" is vignetting factor, "θ" is an inclination angle the subject relative to the optical axis, "F" is F-number of the forming optical system and "m" is lateral magnification of the forming optical system.

When it is supposed that the subject distance from the entrance pupil of the lens is "r", the focal length is "f", and a distance between the entrance pupil and the main axis is "vf" (v is a constant), the lateral magnification m is expressed as follows:

$$m=f/(r-f-vf)$$

If vf is neglected because vf has a minute value, formula (8) can be transformed as follows:

$$E\theta=(\tau\pi L_0 V(r-f)^2 \times \cos^4\theta)/(4F^2 r^2)$$

On the other hand, if a point light source, having luminous intensity I, is portioned close to the entrance pupil and illuminates a subject, which is positioned away from the point light source by a distance $r_L$, illuminance Ei of the subject is expressed as follows:

$$Ei=(I \times \cos\alpha)/(r_L)^2$$

wherein "$\alpha$" is an angle between the optical axis of the light source and a normal line on a surface of the subject. When it is supposed that a reflectance of the surface of the subject is "R" and the surface is a uniformly diffuse surface, a luminance $L_0$ of light, which occurs as the subject is illuminated to function as a two-dimensional light source, is expressed as follows:

$$L_0=(RI \times \cos\alpha)/(\pi \times r_L^2) \qquad (9)$$

By substituting formula (9) for formula (8), the following relationship is obtained:

$$E\theta=(\tau RIV(r-f)^2 \times \cos\alpha \cos^4\theta)/(4F^2 r^2 r_L^2) \qquad (10)$$

Referring to formula (10), when it is deemed that $r_L$ is nearly equal to r and the subject distance is much greater than the focal length, it is understood that the illuminance of the subject falls off approximately at the inverse square of the subject distance. Namely, the illuminance $E\theta$ of the optical image is as follows:

$$E\theta \; 1/r^2 \qquad (11)$$

Since the time $t_1$, corresponding to the accumulated electric charge amount $E_1$ in the first distance measurement mode, increases in proportion to the distance r from the camera to the measurement subject, by multiplying formula (11) by r, the accumulated electric charge amount $E_1$ is expressed as follows:

$$E_1=k_1(1/r)$$

wherein "$k_1$" is a constant. Namely, since the height of a pulse of the reflected light beam decreases at the inverse square of the distance r while the time $t_1$ increases in proportion to the distance r, the accumulated electric charge amount $E_1$ decreases in proportion to the inverse number of the distance r.

The accumulated electric charge amount $E_2$, sensed in the second distance measurement mode, contains a component which increases in proportion to the distance r and corresponds to the time $t_1$, and a component, which does not increase in proportion to the distance r and corresponds to the time $t_0$. Therefore, the accumulated electric charge amount $E_2$ is expressed as follows:

$$E_2=k_{21}(1/r^2)+k_{22}(1/r)$$

wherein $k_{21}$ and $k_{22}$ are constants.

Figure 14:
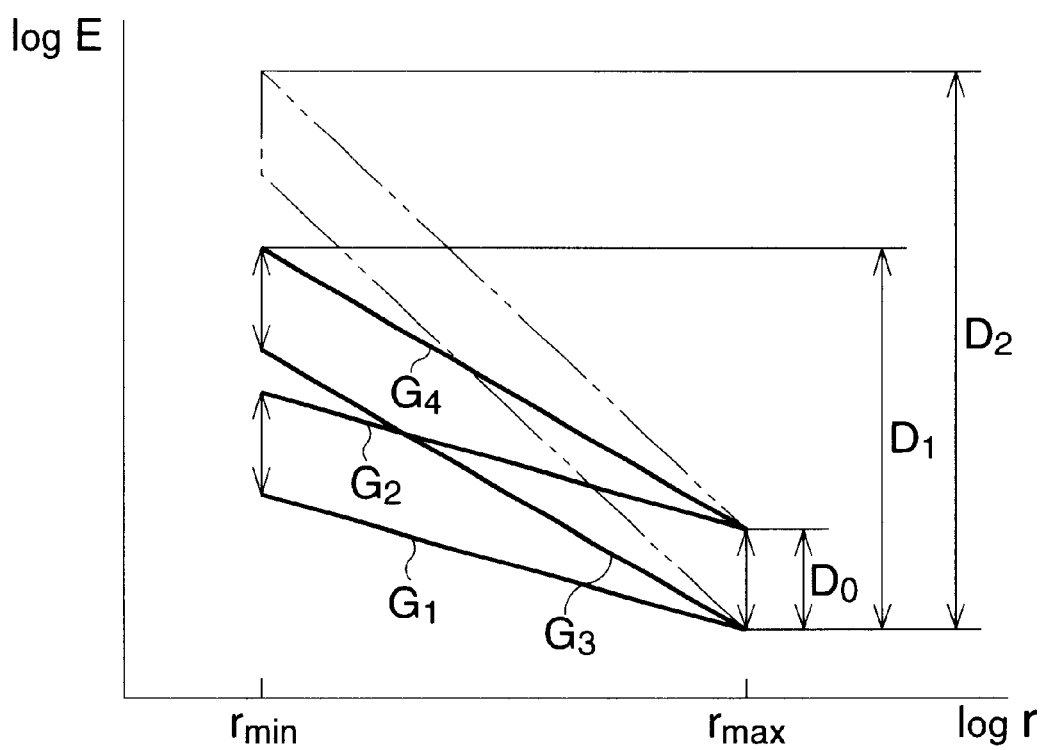
FIG. 14 is a view showing the relationship between an accumulated electric charge and an output range of a CCD.

FIG. 14 is a view showing a relationship between the accumulated electric charge amount and the output range of the CCD 28. The abscissa is the logarithm of the distance r, and the ordinate is the logarithm of the accumulated electric charge amount E.

Since the accumulated electric charge amount $E_1$, obtained in the first distance measurement mode, is in proportion to 1/r, the logarithm of the accumulated electric charge amount $E_1$ is varied in accordance with the breadth $D_0$ of the luminance of the measurement subject within a range sandwiched between the solid lines $G_1$ and $G_2$. Conversely, the accumulated electric charge amount $E_2$ obtained in the second distance measurement mode has a term, which is in proportion to $1/r^2$, and a term, which is in proportion to 1/r, and the logarithm of the accumulated electric charge amount $E_2$ is varied in accordance with the breadth $D_0$ of the luminance of the measurement subject within a range sandwiched between the solid lines $G_3$ and $G_4$. The accumulated electric charge amount $E_2$ becomes close to the accumulated electric charge amount $E_1$ as the distance r increases, and becomes approximately equal to the accumulated electric charge amount $E_1$, at the maximum distance $r_{max}$ which can be sensed.

Accordingly, for performing a distance measurement within a range between the minimum distance $r_{min}$ to the maximum distance $r_{max}$, the CCD 28 needs to have the output range shown by reference $D_1$. Conversely, as a method in which influence of the reflectance of the measurement subject is corrected, all of the pulses of the reflected light beam may be sensed while the distance information sensing operation is not performed in the second distance measurement mode, as described in the specification of U.S. Ser. No. 09/315,821. The accumulated electric charge obtained by this method is used to divide the accumulated electric charge amount $E_1$, so that influence due to the reflected light beam can be removed. However, according to this method which includes the division, a term, which is in proportion to $1/r^2$ and included in the accumulated electric charge, becomes relatively large, as a result, it is necessary to expand the output range of the CCD 28 as shown by reference $D_2$.

Conversely, in the embodiment, the three-dimensional shape of the measurement subject can be sensed with high accuracy, without expanding the output range of the CCD 28.

As described above, according to the embodiment, by calculating the ratio Q of the first reflected light beam component, obtained by the distance measurement sensing operation of the first distance measurement mode, to the second reflected light beam component, obtained by the distance information sensing operation of the second distance measurement mode, the influence of the surface of the measurement subject is removed. Further, prior to the calculation of the ratio Q, the corresponding noise components are removed from each of the first and second reflected light beam components. Therefore, correction of the noise, such as the reflectance, can be carried out with a simple calculation, and further, the output range of the imaging device is restrained as much as possible, so that the distance measurement accuracy of the three-dimensional shape of the measurement subject is improved.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-370787 (filed on Dec. 27, 1999) which are expressly incorporated herein, by reference, in its entirety.

What is claimed is:

1. A three-dimensional image capturing device, comprising:

a light source that irradiates a distance measuring light beam to a measurement subject, said distance measuring light beam being a pulsed beam, said measurement subject reflecting said distance measuring light beam to generate a reflected light beam pulse;

a first reflected light beam component sensing processor that senses said reflected light beam pulse for a first constant period, which starts at a fall of said distance measuring light beam, to sense a first reflected light beam component including a fall of said reflected light beam pulse;

a second reflected light beam component sensing processor that senses said reflected light beam pulse for a second constant period, which has the same length as said first constant period and starts earlier than said fall of said distance measuring light beam, to sense a second reflected light beam component including said fall of said reflected light beam pulse; and a distance calculation processor that obtains the distance from said device to each point of said surface of said measurement subject, based on said first and second reflected light beam components.

2. A device according to claim 1, wherein said distance calculation processor obtains said distance based on a ratio of said first reflected light beam component to said second reflected light beam component.

3. A device according to claim 1, wherein each of said first and second reflected light beam component sensing processors comprises:

a plurality of photoelectric conversion elements that receive said reflected light beam pulse coming from said measurement subject, so that electric charge corresponding to an amount of said received reflected light beam is accumulated in each of said photoelectric conversion elements;

a signal charge holding unit disposed adjacent to each of said photoelectric conversion elements;

an electric charge discharging processor that discharges unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit; and a signal charge integrating processor that drives said electric charge discharging processor and said signal charge transfer processor alternately to integrate said signal charge in said signal charge holding unit, so that first accumulated electric charge, corresponding to each of said first and second reflected light beam components, is sensed.

4. A device according to claim 3, wherein said electric charge discharging processor discharges said unwanted charge at timing earlier than a fall of a pulse of said distance measuring light beam.

5. A device according to claim 1, wherein a distance "d" from said device to each point of said surface of said measurement subject is calculated according to the following formula.

$$d = d_0 \times Q/(1-Q)$$

wherein "Q" is a accumulated electric charge ratio which is obtained by dividing a first accumulated electric charge amount $E_1$, corresponding to said first reflected light beam component, by a second accumulated electric charge amount $E_2$ corresponding to said second reflected light beam, and "$d_0$" is a distance corresponding to a difference between a first sensing timing, at which said first reflected light beam component sensing processor senses said reflected light beam, and a second sensing timing, at which said second reflected light beam component sensing processor senses said reflected light beam.

6. A device according to claim 5, further comprising a first noise component sensing processor that senses a first noise component at a timing the same as that of a first operation by which said first reflected light beam component is sensed, while said light source is turned OFF, and a second noise component sensing processor that senses a second noise component at a timing the same as that of a second operation by which said second reflected light beam component is sensed, while said light source is turned OFF.

7. A device according to claim 6, wherein said accumulated electric charge ratio Q is obtained by dividing a first value, which is obtained by removing a second accumulated electric charge corresponding to said first noise component from said first accumulated electric charge amount $E_1$, by a second value, which is obtained by removing a third accumulated electric charge corresponding to said second noise component from said second accumulated electric charge amount $E_2$.

8. A device according to claim 2, wherein said photoelectric conversion elements are formed on a substrate, and said electric charge discharging processor discharges said unwanted charge to said substrate.

9. A device according to claim 2, wherein said signal charge holding unit is provided in a vertical transfer unit that outputs said signal charge from said three-dimensional image capturing device.

10. The three-dimensional image capturing device of claim 1, wherein the greater a distance between said light source and said measurement subject, a greater an amount of said first reflected light beam component received by said first reflected light beam component sensing processor and an amount of said second reflected light beam component received by said second reflected light beam component sensing processor.

11. The three-dimensional image capturing device of claim 3, wherein said signal charge is repeatedly integrated for a vertical synchronizing period that is between two vertical synchronizing signals.

12. The three-dimensional image capturing device of claim 6, wherein said first and second noise components contain at least ambient light.

* * * * *